(12) United States Patent
Rye et al.

(10) Patent No.: US 8,213,645 B2
(45) Date of Patent: Jul. 3, 2012

(54) BONE CONDUCTION ASSEMBLY FOR COMMUNICATION HEADSETS

(75) Inventors: Ryan P. Rye, Duluth, GA (US); Michael C. Aulert, Fox River, IL (US)

(73) Assignee: Motorola Mobility, Inc., Libertyville, IL (US)

(*) Notice: Subject to any disclaimer, the term of this patent is extended or adjusted under 35 U.S.C. 154(b) by 594 days.

(21) Appl. No.: 12/413,000

(22) Filed: Mar. 27, 2009

(65) Prior Publication Data

US 2010/0246860 A1 Sep. 30, 2010

(51) Int. Cl.
*H04R 25/00* (2006.01)
*H04M 1/00* (2006.01)

(52) U.S. Cl. ......... 381/151; 381/375; 381/326; 381/380

(58) Field of Classification Search .................. 381/151, 381/326, 375, 380, 322, 324, 328, 337, 338; 600/559; 455/569.1
See application file for complete search history.

(56) References Cited

U.S. PATENT DOCUMENTS

| | | | | |
|---|---|---|---|---|
| 3,819,860 A * | 6/1974 | Miller | ............ | 381/380 |
| 4,025,734 A * | 5/1977 | Aloupis | ............ | 381/151 |
| 4,150,262 A * | 4/1979 | Ono | ............ | 381/326 |
| 4,407,389 A * | 10/1983 | Johnson | ............ | 181/135 |
| 4,516,428 A * | 5/1985 | Konomi | ............ | 381/113 |
| 4,588,867 A * | 5/1986 | Konomi | ............ | 379/430 |
| 5,282,253 A | 1/1994 | Konomi | | |
| 5,295,193 A * | 3/1994 | Ono | ............ | 381/151 |
| 5,298,692 A * | 3/1994 | Ikeda et al. | ............ | 181/135 |
| 5,659,620 A | 8/1997 | Kuhlman | | |
| 5,757,934 A * | 5/1998 | Yokoi | ............ | 381/326 |
| 5,887,070 A * | 3/1999 | Iseberg et al. | ............ | 381/380 |
| 5,909,498 A * | 6/1999 | Smith | ............ | 381/380 |
| 7,068,803 B2 | 6/2006 | Kuhlmann et al. | | |
| 7,864,974 B2 * | 1/2011 | Chen | ............ | 381/345 |
| 8,019,107 B2 * | 9/2011 | Ngia et al. | ............ | 381/338 |
| 2006/0133636 A1 * | 6/2006 | Harvey et al. | ............ | 381/380 |
| 2006/0140434 A1 * | 6/2006 | Yang | ............ | 381/380 |

* cited by examiner

*Primary Examiner* — Michelle Mandala
*Assistant Examiner* — Jordan Klein
(74) *Attorney, Agent, or Firm* — Patents on Demand, P.A.; Scott M. Garrett

(57) ABSTRACT

A bone conduction assembly can include at least a microphone, an assembly stem, an ear cushion, and a microphone channel. The microphone can include an acoustic-to-electric transducer. The assembly stem can house the microphone and can be shaped for insertion into an ear canal of a user. The ear cushion can have an inner surface surrounding an outer surface of the assembly stem and an outer, contiguous, annular surface configured to maintain contact with an ear canal of a user when worn. The microphone channel can be shaped to channel vibrations resulting from bone conduction from the ear canal through the assembly stem to the microphone. In one embodiment, the bone conduction assembly can include a speaker having a speaker channel that is acoustically isolated from the microphone channel.

15 Claims, 4 Drawing Sheets

BONE CONDUCTION ASSEMBLY FOR COMMUNICATION HEADSETS

BACKGROUND

The present invention relates to the field of communication devices and, more particularly, to an improved bone conduction assembly for communication headsets.

Communication headsets are becoming smaller, lightweight, and more effective than each previous generation due to technologies such as bone conduction. Bone conduction technology translates sound wave vibrations (e.g., speech) from the bone/flesh pathway. In one implementation, these headsets can have ear canal stems which are inserted into the ear canal that can detect and convey vibrations transmitted from the mouth to the ear canal. The vibrations can be conveyed to a microphone inside the stem which can translate vibrations into speech. Consequently, bone conduction headsets are specially suited to noisy environments such as metropolitan streets, tactical engagements, and highly trafficked public areas.

Bone conduction enabled headsets currently rely on sound wave transmission via one point of contact (e.g., bone conduction assembly) with the ear canal at a specific location. For example, some headsets make contact within the ear canal near the anterior surface of the canal. Often times this point of contact is optimized in shape and/or size to maximize conduction. There still exists, however, many shortcomings with this approach.

Since each individual can be physically different, ear canal shapes and sizes can vary significantly. This can result in headsets which fit some individuals extremely well and others not at all. For example, many headset owners often complain of headsets which fall out of the ear canal frequently. As such, headset owner satisfaction and user experience can vary widely.

Further, it is not uncommon for individuals to frequently adjust headset orientation/position during wearing for reasons of comfort. This can orient/re-orient the headset and consequently the ear canal stem into positions which reduce contact with the bone conduction assembly. When contact with the ear canal is lost, an included microphone fails to pick up vibrations. Hence, the microphone stops working. Less severe, yet still highly problematic, is a situation where contact is made in a less-than-optimal location of the ear canal resulting in poor microphone performance. A less-than-optimal location can include one that does not have a relatively high signal-to-noise ration of the vibrations transmitted from the mouth to the ear canal via a bone/flesh path.

SUMMARY

One aspect of the present invention can include a bone conduction assembly that includes a microphone, an assembly stem, an ear cushion, and a microphone channel. The microphone can include an acoustic-to-electric transducer. The assembly stem for housing the microphone can be shaped for insertion into an ear canal of a user. The ear cushion can have an inner surface surrounding an outer surface of the assembly stem and an outer, contiguous, annular surface configured to maintain contact with an ear canal of a user when worn. The microphone channel can be shaped to channel vibrations resulting from bone conduction from the ear canal through the assembly stem to the microphone.

Another aspect of the present invention can include a bone conduction assembly that includes a microphone, a speaker, an assembly stem, an ear cushion, a microphone channel, and a speaker channel. The microphone can include an acoustic-to-electric transducer. The speaker can include an electric-to-acoustic transducer. The assembly stem for housing the microphone and the speaker can be shaped for insertion into an ear canal of a user. The ear cushion can be configured to maintain contact with an ear canal of a user when worn. The microphone channel can be shaped to channel vibrations resulting from bone conduction from the ear canal through the assembly stem to the microphone. The speaker channel can be shaped to channel sound produced by the speaker to the ear canal. The speaker channel and the microphone channel can be acoustically isolated from each other. The microphone channel and the speaker channel can both be distinct air channels. The microphone channel can be sealed by the ear cushion. An opening can exist between the ear cushion and the speaker channel.

Yet another aspect of the present invention can include an electronic device headset that can include a microphone, a speaker, an assembly stem, a microphone channel, a speaker channel, an ear cushion, and a communication linkage. The microphone can include an acoustic-to-electric transducer. The speaker can include an electric-to-acoustic transducer. The assembly stem for housing the microphone and the speaker can be shaped for insertion into an ear canal of a user. The microphone channel can be shaped to channel vibrations resulting from bone conduction from the ear canal through the assembly stem to the microphone. The speaker channel can be shaped to channel sound produced by the speaker to the ear canal. The speaker channel and the microphone channel can be acoustically isolated from each other. The microphone channel and the speaker channel can both be distinct air channels. The ear cushion can have an inner surface surrounding an outer surface of the assembly stem and an outer, contiguous, annular surface configured to maintain contact with an ear canal of a user when worn. The microphone channel can be sealed by the ear cushion. An opening can exist between the ear cushion and the speaker channel. The communication linkage can be for communicating between the electronic device headset and an electronic device. The communication linkage can be configured to conduct electronic signals from a electronic device to the speaker and can be configured to conduct electronic signals from the microphone to the electronic device. The communication linkage can be a wireless communication linkage or a wired communication linkage. The wireless communication linkage can include a wireless transceiver.

DETAILED DESCRIPTION

The present invention discloses a solution for an improved bone assembly for communication headsets. In the solution, a communication headset having an ear canal stem can have a bone conduction assembly. In one embodiment, the bone conduction assembly can comprise of a microphone and a speaker, each having an independent audio path. In one embodiment, an ear cushion can be fitted onto the stem creating a sealed air channel around the stem containing the microphone diaphragm/sensing surface. The sealed air channel can transmit vibrations to the microphone from any point of the cushion in contact with the surface of the ear canal. As such, the bone conduction assembly can permit the communication headset to function with greater efficiency than traditional bone conduction headsets.

Figure 1:
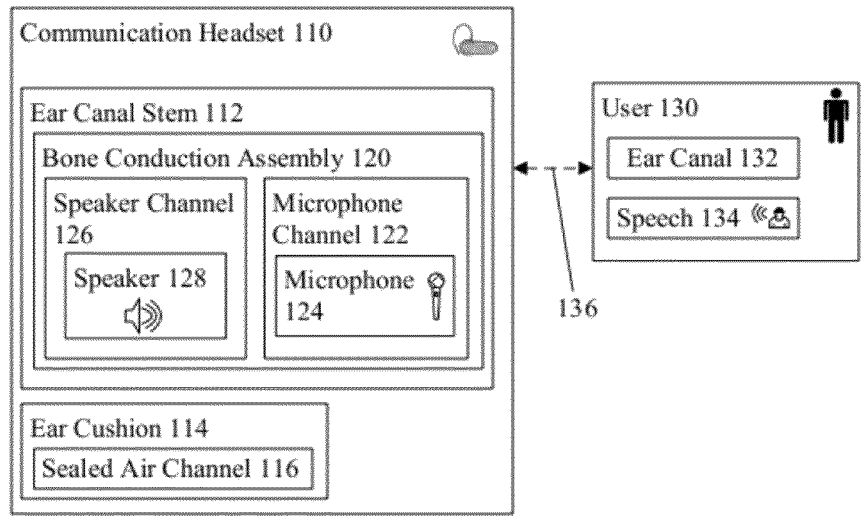
FIG. 1 is a schematic diagram illustrating an assembly for improved bone conduction within a communication headset.
Figure 1:
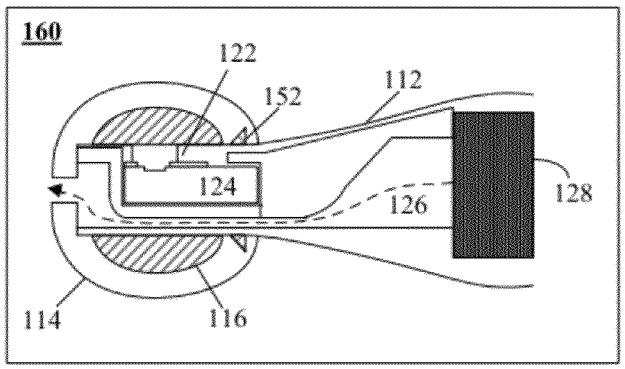
Figure 1:
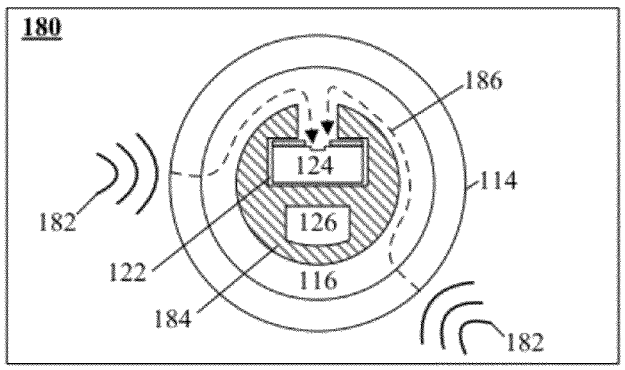

FIG. 1 is a schematic diagram illustrating an assembly 120 for improved bone conduction within a communication headset. As used herein, bone conduction refers to the conduction of sound to the inner ear through the bones of the skull. The headset 110 can be an ear-mounted headset designed to fit arranged inside an ear canal 132. Ear canal stem 112 can have an ear cushion 114 at end portion of stem 112 that is placed into the ear canal 132. Cushion 114 can be fitted in ear canal 132 such that the complete exterior surface of the cushion 114 fully contacts the inner area of the ear canal 132. As such, the cushion 114 can be made to fit snugly into ear canal 132 causing frictional contact with the surrounding ear tissue in ear canal 132. Using a sound conductive material for cushion 114 enables speech 134 to be absorbed and transmitted to microphone 124 via channel 116.

As the user 130 speaks, vibrations 136 from speech 132 can be conducted from the jawbone of user 130 to the ear canal 132. Vibrations 136 can be absorbed by ear cushion 114 from multiple points of contact within the ear canal 132. These vibrations 136 can be automatically propagated to sealed air channel 116 via normal vibrational transmission means (e.g., resonance). Air channel 116 adjoined to a microphone channel 122 can permit vibrations 136 to be received by a microphone 124. Creating multiple points of contact with the bone/flesh pathway in this manner can result in vibrations 136 from any point in the ear canal 132 which is in contact with the ear cushion 114 to be propagated to microphone 124. Since current bone conduction headsets utilize one point of contact with the bone/flesh pathway, specific orientations for effective operation are required. Headset 110 arrangements can be advantageous in allowing performance to be unaffected by positioning and/or orientation of the headset 110. As such, headset 110 usability is greatly increased over current bone conduction headsets.

In one embodiment, the ear cushion 114 can be annularly shaped. It can also create a sealed 360-degree air channel (which includes microphone channel 122 and sealed air channel 116) around the microphone 124 diaphragm/sensing surface. Thus, a sealed air path is created to the microphone 124 for vibrations that impede upon any point around the circumference of the air cushion 114.

A contemplated embodiment of system 100 can be illustrated in configurations 160, 180. Configurations 160, 180 illustrate sectional views of the same contemplated embodiment such that essential details can be clearly depicted. Configuration 160 depicts a longitudinal cross-section of the communication headset 110 having an improved bone conduction assembly. As used herein, longitudinal is to be understood from the drawing 160 as the distance from the ear cushion 114 to the speaker 128. Configuration 180 discloses a transverse cross-section of the communication headset 110, where transverse is understood to be from drawing 160 along the vertical axis bisecting cushion 114.

Communication headset 110 can be a wired and/or wireless communication device having at least one audio transducer (speaker 128 and/or microphone 124). For example, headset 110 can be an EARS-FREE headset of headphone. In another example, headset 110 can be a hearing aid or other assistive listening device. In still another example, headset 110 can be a specialized communication product, such as an underwater or high-noise communication product.

As shown, headset 110 can include ear canal stem 112, ear cushion 114, sealed air channel 116, bone conduction assembly 120, microphone channel 112, microphone 124, speaker channel 126, speaker 128, and/or other such components. A portion of the headset 110 (e.g., ear canal stem 112) can be placed into the ear canal 132 leaving the resulting portion of the headset exposed, proximate to the outer ear (not shown). For instance, common wireless headsets have an ear canal stem joined to headset body, where the headset body is in contact to the outer ear. The exposed portion can comprise of headset controls, display, charging ports, and the like permitting user configuration of headset 110. Headset 110 can be compliant with technologies such as BLUETOOTH, ZIGBEE, Wireless Universal Serial Bus (USB), Ultra-wide Band (UWB), and the like.

Ear cushion 114 can refer to a deformable component of headset 110 that permits the stem 112 to fit snugly in the ear canal 132 through friction. That is, when worn, ear cushion 114 can maintain direct contact with the ear canal 132. The ear cushion 114 can yield to pressure that causes it to contract in volume (e.g., useful to insert cushion 114 into the ear canal 132) when pressure is applied and to expand in volume when pressure is no longer applied. Cushion 114 can be sufficiently large to fit into the ear canal 132 of user 130 in a manner that maintains contact with the ear canal 132. Cushion 114 can be manufactured from common materials such as foam rubber, gel filled materials, and the like. In one embodiment, thin-walled cushions made from dense, low-porous rubber materials are recommended since their density would allow for direct transmission of bone/flesh vibrations, while their low-porosity would minimize any exterior acoustic noise that could pass through/into the cushion. Using materials which can deform, the ear cushion 114 can remove unique fitting requirements common to traditional bone conducting headsets. Alternatively, when using a non-deforming cushion 114, the ear cushion 114 can be manufactured to conform to different sized ear canals 132 of the users. Contemplated sizes include, but are not limited to, cushions 114 having a diameter of approximately 8.6 mm, 9 mm, 10 mm, 11 mm, 12 mm, etc.

As used herein, user 130 can be a human agent utilizing headset 110 to perform communication actions. For instance, user 130 can be a security operative interacting with a two-way radio via headset 110. Caller 130 speech 134 can be understood to exist within the normal human speech range (e.g., 85 Hz-255 Hz), unless otherwise stated. As used herein, ear canal 132 can be the external auditory meatus extending from the eardrum to the pinna. Known physiology of ear canal 132 can be used to create suitably sized stems 112 and to maximize performance of assembly 120. For instance, the portion of the stem 112 to be placed into the ear canal can be ergonomically tapered to maximize wearing comfort.

Bone conduction assembly 120 can be a containing structure having a microphone channel 122 and a speaker channel 126. Assembly 120 can be housed within stem 112 which can include a molded framework able to accommodate one or more microphone and/or speaker channels. In one configuration, assembly 120 can be a single molded structure having a cavity for a microphone 124 and an isolated cavity for speaker 128. Alternatively, channels 122, 126 can be independent modular structures able to be securely fitted into assembly 120 via adhesive and/or non-adhesive mechanisms (e.g., friction fit). In this configuration, assembly 120 can be modified easily when design improvements are achieved to allow channel 122, 126 to be modularly replaced without significant alteration to assembly 120. A modular assembly 120 also permits a common manufacturing process of differentially priced headsets 110. For example, a relatively inexpensive headset 110 can utilize a speaker channel 126 including a basic 6.4 mm diameter speaker 128, where a more expensive headset 110 can utilize a speaker channel 126 that includes a balanced armature speaker 128.

Microphone channel 122 can be a hollow cavity capable of incorporating one or more microphones 124. Channel 122 can allow microphone 124 to be positioned securely within the cavity while enabling vibrations 136 to be received from air channel 116. In one embodiment, multiple microphones 124 can be placed at different positions within channel 122 to aid in detecting vibrations 136. An air channel can refer to a chamber filled with any gas. Each of the channels 122, 126, 116 can be a pathway for conveying vibrations 182, such as the vibrations 182 generated by speaker 128 and/or detected by microphone 124. In one embodiment, the speaker channel 126 and the microphone channel 124 can be acoustically isolated from each other. Acoustic isolation inhibits a conveyance of vibrations conducted through one channel 122, 126 from being conveyed to the other channel 122, 126. For example, acoustic isolation can refer to a dampening of sound/vibration (for example, by twenty-five percent or less) transference from one channel 122, 126 to the other.

Microphone 124 can be a sensor responsive to vibrations and changes in air pressure. Microphone 124 can include, but is not limited to, pressure gradient microphone, MicroElectrical-Mechanical System (MEMS) microphone, and the like. In one embodiment, microphone 124 can be a piezoelectric speaker having the appropriate dimensions to be suitably placed into channel 122.

In configuration 160, an embodiment of headset 110 can have an annular sealed air channel 116. Air channel 116 can be created by a space formed between ear cushion 114 and stem 112. Cushion 114 can create the sealed annular air channel 116 through contact with stem 112, which can enable channel to become a resonating cavity. In one embodiment, channel 116 can be an oblate spheroid channel formed from around stem 112. Annular air channel 116 can provide optimum cavity for which vibrations can be conveyed to microphone 124 via vocal resonance. Annular air channel 116 size can vary depending on implementation and acoustic requirements (e.g., vocal range). For instance, based on empirical testing one or more optimum channel 116 widths can be used to offset cushion 114 vibration absorption.

Cushion 114 can be attached to stem 112 through adhesive and/or non-adhesive means. When attached through non-adhesive means (e.g., friction fit), cushion 114 can be interchangeable, allowing differing size cushions 114 to be optionally used. In one embodiment, cushion 114 can be designed to fit tightly over stem 112 interlocked with ridges 152. Ridges 152 can be protrusions formed from stem 112 preventing movement of cushion 114, which can assist in maintaining sealed air channel 116. Other mechanisms for harnessing cushion 114 to stem 112 can be utilized providing the harnessing does not impede headset capability 110.

In one embodiment, microphone 124 can be positioned within a well-like cavity which can assist in reducing extraneous vibrations. In this embodiment, microphone 124 can be exposed to the air channel 116 enabling vibrations from specific regions within the surrounding channel 116 to be detected.

In configuration 160, speaker channel 126 can be isolated from microphone channel 122 within the bone conduction assembly to impede echoes emanating from speaker 128. In one embodiment, channel 126 can include noise dampening material/texture to reduce the likelihood of sound being transmitted to the cavity 124, channel 122, and microphone 124. Speaker channel 126 can be positioned at any region within assembly 184 permitting the channel 126 is isolated from microphone channel 122.

In configuration 180, vibrations 182 transmitted from an ear canal can contact the perimeter of ear cushion 114 at any point. A vibration 182 can refer to a force that oscillates about a specified reference point. Vibrations 182 can be transmitted through a solid, liquid or gas. The vibrations 182 important for configuration 180 are composed of frequencies corresponding to a range of frequencies within a human hearing range and which are within the sensitivity range of the microphone 124.

Vibrations 182 can be absorbed by cushion 114 and transmitted into annular air channel 116. Vibrations 182 in air channel 116 can be distributed throughout channel 116 and can be received by microphone 124, as shown in path 186. Once vibrations 182 reach microphone 124, signal processing can be performed. Processing can include, but is not limited to, amplification, noise cancellation, speech recognition, and the like.

It can be seen from embodiment 180 that the ear cushion 114 can have an outer, contiguous annular surface. This surface can create a seal between the ear canal 132 and the stem 112 which reduces an amount of sound able to be conveyed across a barrier of the seal. Annular refers to being shaped in an approximately ring-like manner meaning has an approximately round cross-section. Contiguous refers to the surface that is sufficiently solid and continuous to form a seal. In one embodiment, the contiguous surface can have a relatively smooth continuous circumference.

Drawings presented herein are for illustrative purposes only and should not be construed to limit the invention in any regard. Air channel 116 can be constructed to be any shape and/or size necessary for implementation requirements. Cushion 114 can be comprised of composite materials which have appropriate acoustic properties.

Figure 2:
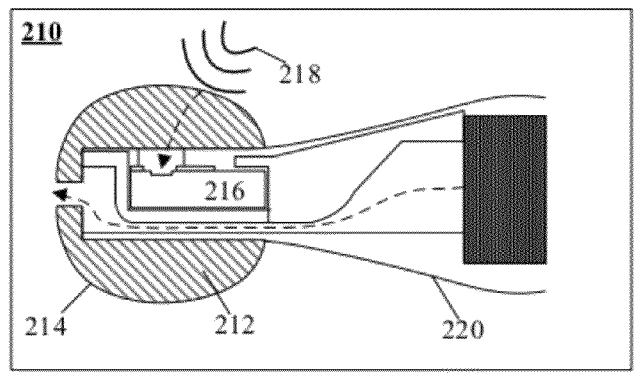
FIG. 2 is a schematic diagram illustrating a set of embodiments for improving bone conduction within communication headsets.
Figure 2:
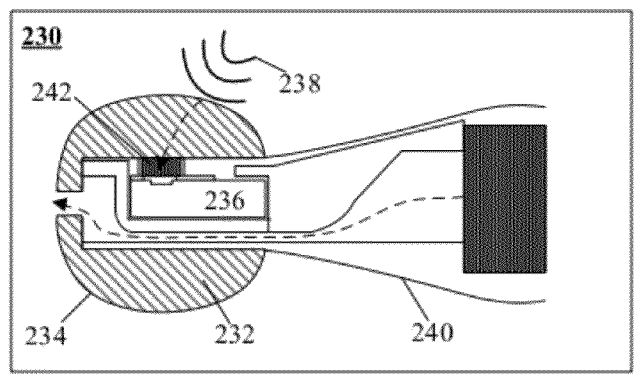
Figure 2:
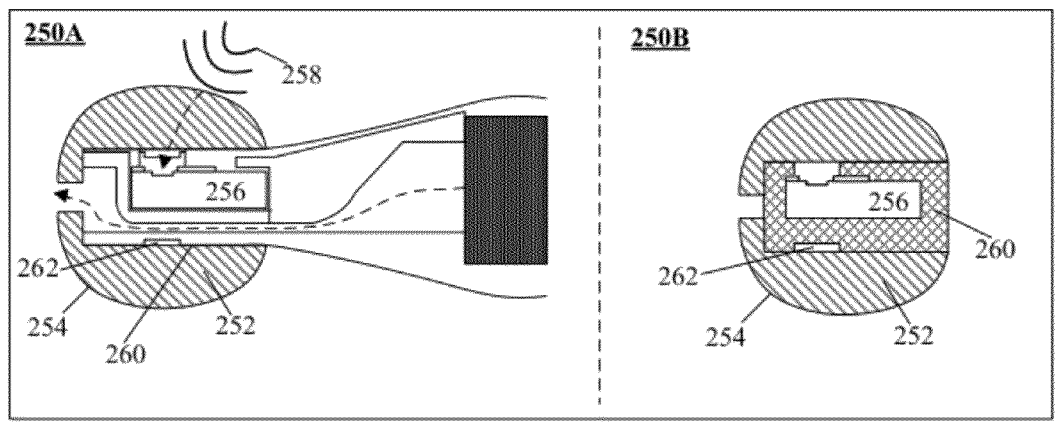

FIG. 2 is a schematic diagram illustrating a set of embodiments 210-250A, 250B for improving bone conduction within communication headsets in accordance with an instance of the inventive arrangements disclosed herein. In embodiments 210-250B, various configurations on headset 110 can be arranged into one or more contemplated implementations. In arrangement 210, an ear cushion 212 can extend over a microphone 216 located in a channel within headset 220 resulting in a sealed air cavity existing in the microphone channel. In embodiment 230, microphone 236 can be coupled to a column abutted to ear cushion 234, resulting in direct transmission of vibrations from cushion 234 to microphone 236. In embodiment 250A, 250B, the assembly 260 of a headset can be configured to create a sealed ribbon air channel when an ear cushion 252 is positioned over the microphone 256 (i.e., the 360-degree air channel is built into the ear stem (as an annular ring) instead of being built into the ear cushion). Sectional view 250B presents a simplified representation of embodiment 250A lacking a speaker channel which has been omitted for illustrative purposes.

In embodiment 210, ear cushion 212 can have a solid inner portion which can contact headset 220 circumferentially over the portion the ear cushion 212 is positioned. This solid inner portion can be formed by a solid uniform material where a solid uniform material lacks a hollow cavity and permits vibrations to travel through the cushion 214 in a relatively uniform manner. In this embodiment, ordinary ear cushions can be utilized with headset 220 without requiring specially designed ear cushions to be used. Without a hollow cavity for resonation to occur, cushion 212 density can be adjusted to permit vibrations to be effectively communicated to microphone 216. Signal processing can be employed to counteract any potential signal attenuation which can occur in configuration 210.

In embodiment 230, ear cushion 232 can be positioned against a stinger 242 which fits into the microphone channel of headset 240. In one embodiment, the stinger 242 and cushion 232 can be separately but directly coupled to microphone 236. Stinger 242 can be affixed inside the microphone channel positioned against the microphone 236. Stinger 242 can be composed of materials which respond favorably to vibrational movement, decreasing the likelihood of vibration dampening. In embodiment 220, microphone 236 can be an accelerometer able to receive vibrational movement from any point within the cushion 232 and subsequently stinger 242.

In embodiment 250A, 250B, headset stem 260 can be constructed to have a depressed groove 262 covered over by ear cushion 252. The groove 262 can form a sealed air channel adjoined to microphone 256 channel. Vibration 258 emanating from an ear canal can be transmitted from any point of ear canal 252 to groove 262. Groove 262 can act as a resonating chamber causing vibrations 258 to be directly and/or indirectly received by microphone 256.

Drawings presented herein are for illustrated purposes only and should not be construed to limit the invention in any regard. Cushion 212, 232, 252 shape/size/density can vary to compensate for signal attenuation and/or acoustic requirements. Configurations for receiving bone conducted vibrations from two or more points of contact within an ear canal are not limited to the embodiments shown.

Figure 3:
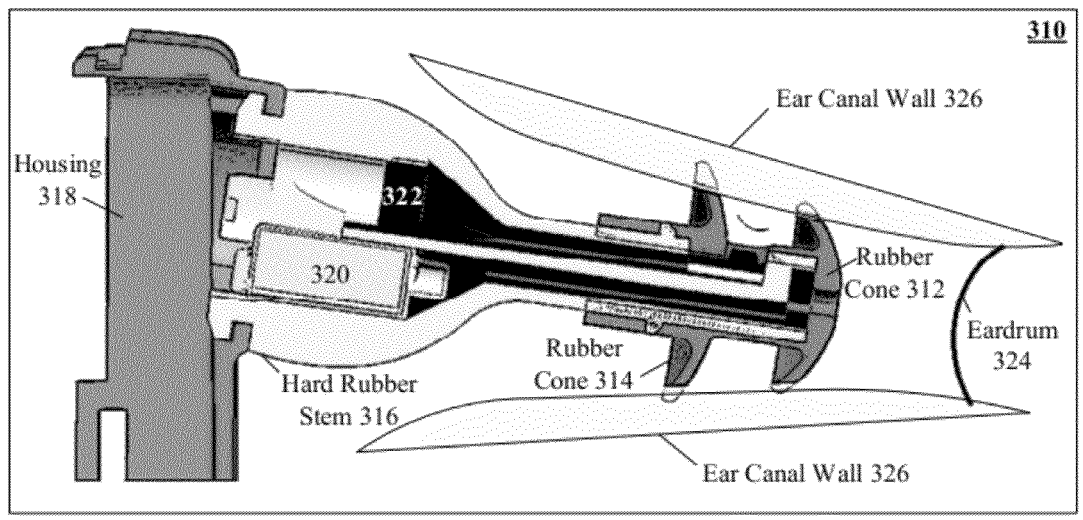
FIG. 3 is a schematic diagram illustrating an embodiment for improving bone conduction within communication headsets.
Figure 3:
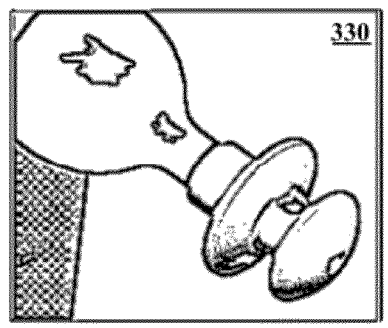
Figure 3:
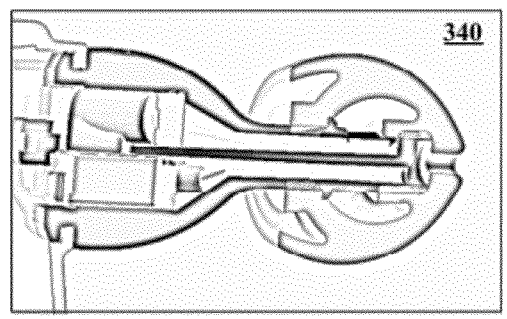
Figure 3:
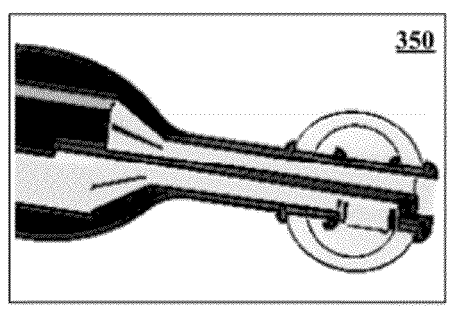

FIG. 3 is a schematic diagram illustrating an embodiment 310 for improving bone conduction within communication headsets. Embodiment 310 moves the microphone 322 closer (compared to embodiment 210) to a main portion of the headset. This allows a thinner tip (ear cushion) to be inserted into the ear. The inner tip can be relatively thin, which may make it more comfortable to wear than headsets having thicker inner tips. The tip can include first rubber cone 312 and second rubber cone 314, each of which can directly contact the ear canal wall 326. The first cone 312 can help isolate the speaker 320 and microphone 322 paths from each other. The second cone 314 can help isolate the microphone 322 path from outside noise. An alternative to the double cone of embodiment 310 is to use a triple-cone configuration, which could further aid in outside noise isolation.

As shown, housing 318 can represent a bottom portion of a plastic headset housing. The stem 316 can be a hard rubber stem designed to be rigid but flexible to accommodate different ear canal shapes. An air channel can extend from the speaker 320 through the stem 316 to release and direct generated sound to eardrum 324. Diagram 330 shows an exterior view of embodiment 310.

The double cone tip shown in embodiment 310 is just one possible shape for the ear cushion. Other shapes for the ear cushion can include, but are not limited to, a bullet shape (as shown by diagram 340) and a circular shape having an exposed stem ending (as shown by diagram 350).

Figure 4:
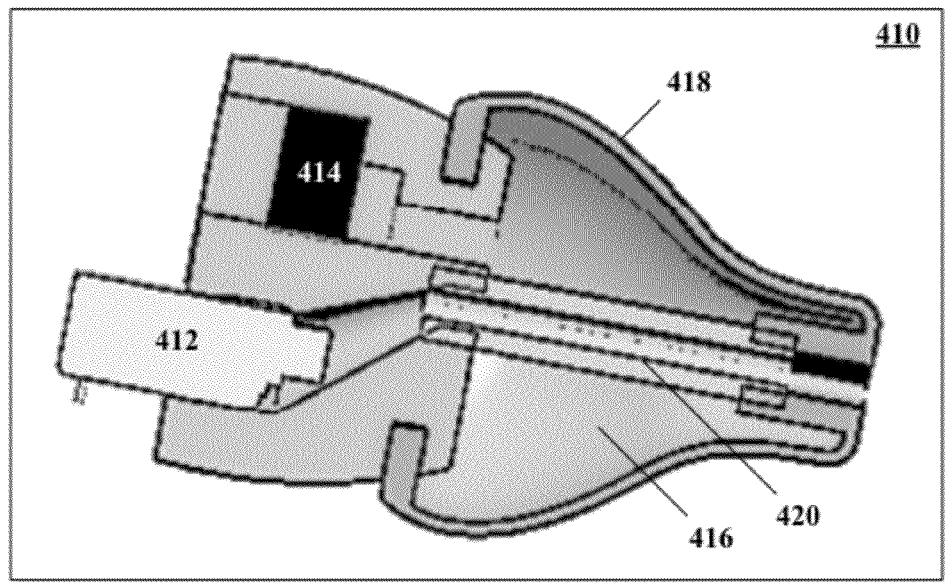
FIG. 4 is a schematic diagram illustrating an embodiment for improving bone conduction within communication headsets.
Figure 4:
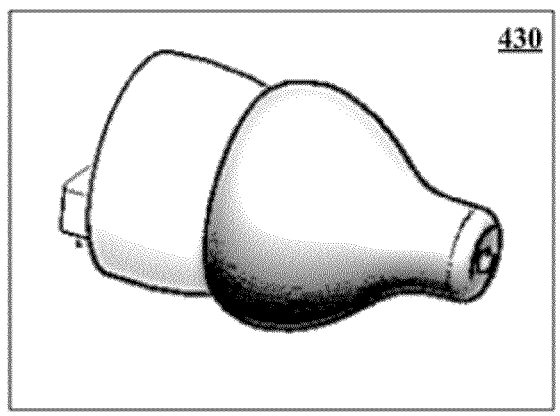
Figure 4:
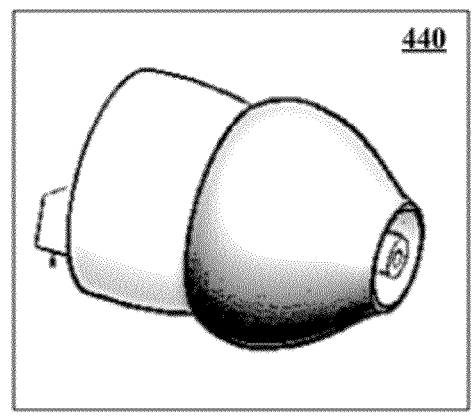

FIG. 4 is a schematic diagram illustrating an embodiment 410 for improving bone conduction within communication headsets. Embodiment 410 shows a headset assembly having a bell shaped ear cushion 418 and a microphone 414 and speaker 414 disposed in the headset housing. Speaker channel 420 can be used to isolate the speaker 412 and the microphone 414. The interior of the ear cushion 418 can include an inner ring of air 416, which is part of an unobstructed air pathway to the microphone 416 sensor. Diagram 430 shows an exterior view of embodiment 410. Diagram 440 shows a view of embodiment 410 with a cross section though the tip.

The block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A bone conduction assembly comprising:
    a microphone comprising an acoustic-to-electric transducer;
    an assembly stem for housing said microphone and shaped for insertion into an ear canal of a user;
    an ear cushion having an inner surface surrounding an outer surface of said assembly stem and an outer, contiguous, annular surface configured to maintain contact with an ear canal of a user when worn; and
    a microphone channel shaped to channel vibrations resulting from bone conduction from the ear canal through the assembly stem to the microphone, wherein the microphone channel comprises a sealed, 360-degree air channel between the ear cushion and the assembly stem housing, wherein the microphone channel further comprises a second air channel extending between an acoustic sensor of the microphone and the 360-degree air channel of the ear cushion, whereby said assembly is constructed so that vibrations are conveyed through the material of the ear cushion, to the 360-degree air channel, to the air channel, to the acoustic sensor, where the microphone converts the vibrations to electric signals.

2. The assembly of claim 1, further comprising:
    a speaker comprising an electric-to-acoustic transducer, wherein said speaker is housed in said assembly stem; and
    a speaker channel shaped to channel sound produced by the speaker to the ear canal, wherein the speaker channel and the microphone channel are acoustically isolated from each other.

3. The assembly of claim 2, wherein said microphone channel and said speaker channel are both distinct air channels, wherein said microphone channel is sealed by the ear cushion, and wherein an opening exists between the ear cushion and said speaker channel.

4. The assembly of claim 1, wherein said ear cushion is a solid uniform material, wherein the second air channel of the microphone channel extends between the acoustic sensor of the microphone and an inner surface of the ear cushion.

5. The assembly of claim 1, wherein said microphone channel comprises a rubber material directly coupled to the ear cushion and directly coupled to a microphone sensor of the microphone or directly coupled to an accelerometer, wherein the rubber material is configured to transfer any circumferentially-detected vibrations of the ear cushion to the microphone sensor or to the accelerometer.

6. The assembly of claim 1, wherein said ear cushion is a solid uniform material, wherein the 360-degree air channel is in contact with a circumference of the inner surface of the ear cushion, wherein the the 360-degree air channel is an air channel shaped in the assembly stem.

7. A bone conduction assembly comprising:
  a microphone comprising an acoustic-to-electric transducer;
  a speaker comprising an electric-to-acoustic transducer;
  an assembly stem for housing said microphone and said speaker and shaped for insertion into an ear canal of a user;
  an ear cushion configured to maintain contact with an ear canal of a user when worn, the ear cushion having an inner surface surrounding an outer surface of said assembly stem, and an outer, contiguous, annular surface;
  a microphone channel shaped to channel vibrations resulting from bone conduction from the ear canal through the assembly stem to the microphone, the microphone channel having a sealed 360-degree air channel between the ear cushion and the assembly stem housing, and an air channel extending between an acoustic sensor of the microphone and the 360-degree air channel of the ear cushion, whereby said assembly is constructed so that vibrations are conveyed through the material of the ear cushion, to the 360-degree air channel, to the air channel, to the acoustic sensor, where the microphone converts the vibrations to electrical signals; and
  a speaker channel shaped to channel sound produced by the speaker to the ear canal, wherein the speaker channel and the microphone channel are acoustically isolated from each other, wherein said microphone channel and said speaker channel are both distinct air channels, wherein said microphone channel is sealed by the ear cushion, and wherein an opening exists between the ear cushion and said speaker channel.

8. The assembly of claim 7, wherein said bone conduction assembly is a headset for a mobile communication device.

9. The assembly of claim 8, wherein the headset is a wireless headset and wherein the mobile communication device is a mobile phone.

10. An electronic device headset comprising:
  a microphone comprising an acoustic-to-electric transducer;
  a speaker comprising an electric-to-acoustic transducer;
  an assembly stem for housing said microphone and said speaker and shaped for insertion into an ear canal of a user;
  a microphone channel shaped to channel vibrations resulting from bone conduction from the ear canal through the assembly stem to the microphone;
  a speaker channel shaped to channel sound produced by the speaker to the ear canal, wherein the speaker channel and the microphone channel are acoustically isolated from each other, wherein said microphone channel and said speaker channel are both distinct air channels;
  an ear cushion having an inner surface surrounding an outer surface of said assembly stem and an outer, contiguous, annular surface configured to maintain contact with an ear canal of a user when worn, wherein said microphone channel is sealed by the ear cushion, and wherein an opening exists between the ear cushion and said speaker channel;
  a communication linkage for communicating between the electronic device headset and an electronic device, wherein said communication linkage is configured to conduct electronic signals from a electronic device to the speaker and is configured to conduct electronic signals from the microphone to the electronic device, wherein said communication linkage is a wireless communication linkage or a wired communication linkage, wherein said wireless communication linkage comprises a wireless transceiver; and
  wherein the microphone channel comprises a sealed, 360-degree air channel between the ear cushion and the assembly stem housing, and wherein the microphone channel further comprises an air channel extending between an acoustic sensor of the microphone and the 360-degree air channel of the ear cushion, whereby said assembly is constructed so that vibrations are conveyed through the material of the ear cushion, to the 360-degree air channel, to the air channel, to the acoustic sensor, where the microphone converts the vibrations to electrical signals.

11. The electronic device headset of claim 10, wherein said ear cushion is a solid uniform material, wherein the air channel of the microphone channel extends between the acoustic sensor of the microphone and an inner surface of the ear cushion.

12. The electronic device headset of claim 10, wherein said microphone channel comprises a rubber material directly coupled to the ear cushion and directly coupled to a microphone sensor of the microphone or directly coupled to an accelerometer, wherein the rubber material is configured to transfer any circumferentially-detected vibrations of the ear cushion to the microphone sensor or the accelerometer.

13. The electronic device headset of claim 10, wherein said ear cushion is a solid uniform material, wherein said microphone channel comprises an annular air channel in contact with a circumference of the inner surface of the ear cushion, wherein the annular air channel is an air channel shaped in the assembly stem.

14. The electronic device headset of claim 10, further comprising:
  at least one user selectable control exposed when the assembly stem is placed in an ear canal of a user, wherein said user selectable control is a headset control a selection of which causes a signal associated with the selection to be conveyed over the communication linkage to the electronic device, which results in a change of state being triggered in the electronic device, wherein the change of state corresponds to the selection.

15. The electronic device headset of claim 14, wherein said communication linkage is a wireless communication linkage, and wherein said electronic device is a mobile phone.

* * * * *